(12) United States Patent
Bae et al.

(10) Patent No.: US 9,263,724 B2
(45) Date of Patent: Feb. 16, 2016

(54) BATTERY PACK

(75) Inventors: Sang-Hoon Bae, Yongin-si (KR); Sang-Do Heo, Yongin-si (KR); Seok Koh, Yongin-si (KR); Kyung-Ho Park, Yongin-si (KR); Young-Ho Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 469 days.

(21) Appl. No.: 12/872,939

(22) Filed: Aug. 31, 2010

(65) Prior Publication Data

US 2011/0086243 A1    Apr. 14, 2011

Related U.S. Application Data

(60) Provisional application No. 61/250,828, filed on Oct. 12, 2009.

(51) Int. Cl.
| | |
|---|---|
| *H01M 2/00* | (2006.01) |
| *H01M 2/34* | (2006.01) |
| *H01M 2/10* | (2006.01) |
| *H01M 10/42* | (2006.01) |

(52) U.S. Cl.
CPC .............. *H01M 2/34* (2013.01); *H01M 2/1022* (2013.01); *H01M 10/425* (2013.01)

(58) Field of Classification Search
None
See application file for complete search history.

(56) References Cited

U.S. PATENT DOCUMENTS 7,989,105 B2   8/2011  Suzuki et al.

2005/0208346 A1*  9/2005  Moon et al. ........................ 429/7
2005/0221176 A1  10/2005  Kim
2006/0121336 A1*  6/2006  Yoon ................................ 429/53
2007/0160878 A1*  7/2007  Kim et al. ......................... 429/7
2009/0123834 A1   5/2009  Byun

FOREIGN PATENT DOCUMENTS

| CN | 1677709 A | 10/2005 |
|---|---|---|
| CN | 1918726 A | 2/2007 |
| CN | 101341609 A | 1/2009 |
| CN | 101436681 A | 5/2009 |
| JP | 2006-228715 | 8/2006 |
| KR | 1020030033594 A * | 5/2003 |
| KR | 10-2005-0081175 | 8/2005 |
| KR | 2005-0081175 | 8/2005 |
| KR | 100614278 | 8/2006 |

(Continued)

OTHER PUBLICATIONS

Extended European Search Report dated Feb. 3, 2011 in Application No. 10176881.0.

(Continued)

*Primary Examiner* — Ula C Ruddock
*Assistant Examiner* — Daniel Gatewood
(74) *Attorney, Agent, or Firm* — Knobbe Martens Olson & Bear LLP (57) ABSTRACT

A battery pack is disclosed. An embodiment of the battery pack includes a bare cell, wherein the bare cell comprises a terminal; a circuit module coupled with the bare cell, wherein the circuit module comprises a protective device; and a cover disposed over the circuit module and coupled with the bare cell; wherein the circuit module comprises a through-hole, the cover comprises a protrusion, the protrusion engages with the through-hole, and the through-hole enables welding of the protective device of the circuit module to the terminal of the bare cell through the through-hole.

16 Claims, 9 Drawing Sheets

(56) References Cited

FOREIGN PATENT DOCUMENTS

| KR | 10-2009-0047071 | | | 4/2009 |
|---|---|---|---|---|
| KR | 10-2009-0042734 | | | 5/2009 |
| KR | 10-2009-0048857 | | | 5/2009 |
| KR | 20090048857 | A | * | 5/2009 |
| KR | 10-2009-0055812 | | | 6/2009 |
| KR | 10-2009-0055812 | A | | 6/2009 |
| KR | 10-2009-0097267 | | | 9/2009 |
| KR | 20090097267 | A | * | 9/2009 |
| WO | WO 2005/078825 | A1 | | 8/2005 |
| WO | WO 2007/073066 | A1 | | 6/2007 |
| WO | WO 2009/025433 | A1 | | 2/2009 |
| WO | WO 2009/066953 | A2 | | 5/2009 |
| WO | WO 2009/069944 | A2 | | 6/2009 |

OTHER PUBLICATIONS

Office Action dated Dec. 20, 2011 for corresponding KR Application No. 10-2010-0089456.

Office Action dated Jan. 29, 2013 for corresponding JP Application No. 2010-228852.

Office Action issued on Sep. 18, 2014 for Chinese Patent Application No. 201010504287.3.

Chinese Office Action dated Jan. 24, 2014 for Chinese Patent Application No. CN 201010504287.3 which claims priority from U.S. Appl. No. 61/250,828, filed Oct. 12, 2009, and captioned U.S. Appl. No. 12/872,939.

* cited by examiner

BATTERY PACK

CROSS-REFERENCE TO RELATED APPLICATIONS

This application claims priority to and the benefit of U.S. Provisional Application No. 61/250,828, filed on Oct. 12, 2009, the entire content of which is incorporated herein by reference.

BACKGROUND

1. Field

The present disclosure relates to a battery pack, and more particularly, to a battery pack including a battery and a circuit.

2. Description of the Related Technology

As the technology of mobile devices, such as cellular phones and notebook computers, has become remarkably developed and production thereof has increased, the demand for secondary batteries as an energy source for mobile devices has rapidly increased. Recently, much research into secondary batteries as an alternative energy resource for fossil fuel used in electric vehicles and hybrid electric vehicles has been conducted.

In general, such secondary batteries are used in the form of a battery pack integrated with a circuit for controlling charging and discharging operations. In order to secure stability of secondary batteries including flammable materials, the battery pack typically has a circuit for controlling abnormal operating environment of overcharging, over-discharging, over-current, or the like. The circuit mounted on a battery typically has an upper cover. Conventional battery packs do not include an assembling structure for aligning the upper cover at the right position on the battery and assembling the upper cover with the battery, and consequently, time loss increases during the assembly of the upper cover, and defects caused by misalignment also increase.

SUMMARY

According to an embodiment, a battery pack comprises a bare cell, wherein the bare cell comprises a terminal; a circuit module coupled with the bare cell, wherein the circuit module comprises a protective device; and a cover disposed over the circuit module and coupled with the bare cell; wherein the circuit module comprises a through-hole, the cover comprises a protrusion, the protrusion engages with the through-hole, and the through-hole enables welding of the protective device of the circuit module to the terminal of the bare cell through the through-hole.

According to another embodiment, a battery pack comprises a bare cell, wherein the bare cell comprises a terminal; a circuit module coupled with the bare cell; a cover disposed over the circuit module and coupled with the bare cell; and a protrusion extending from the cover, wherein the protrusion comprises two ribs in a cross structure; wherein the circuit module comprises a through-hole and the protrusion engages with the through-hole.

According to another embodiment, a battery pack comprises a bare cell, wherein the bare cell comprises a terminal; a circuit module coupled with the bare cell; a cover disposed over the circuit module and coupled with the bare cell; and a protrusion extending from the cover; wherein the circuit module comprises a through-hole and the protrusion engages with the through-hole; and wherein the protrusion and the through-hole have the same shape and substantially the same dimensions.

DETAILED DESCRIPTION

Hereinafter, embodiments of the present invention will now be described more fully with reference to the accompanying drawings.

Figure 1:
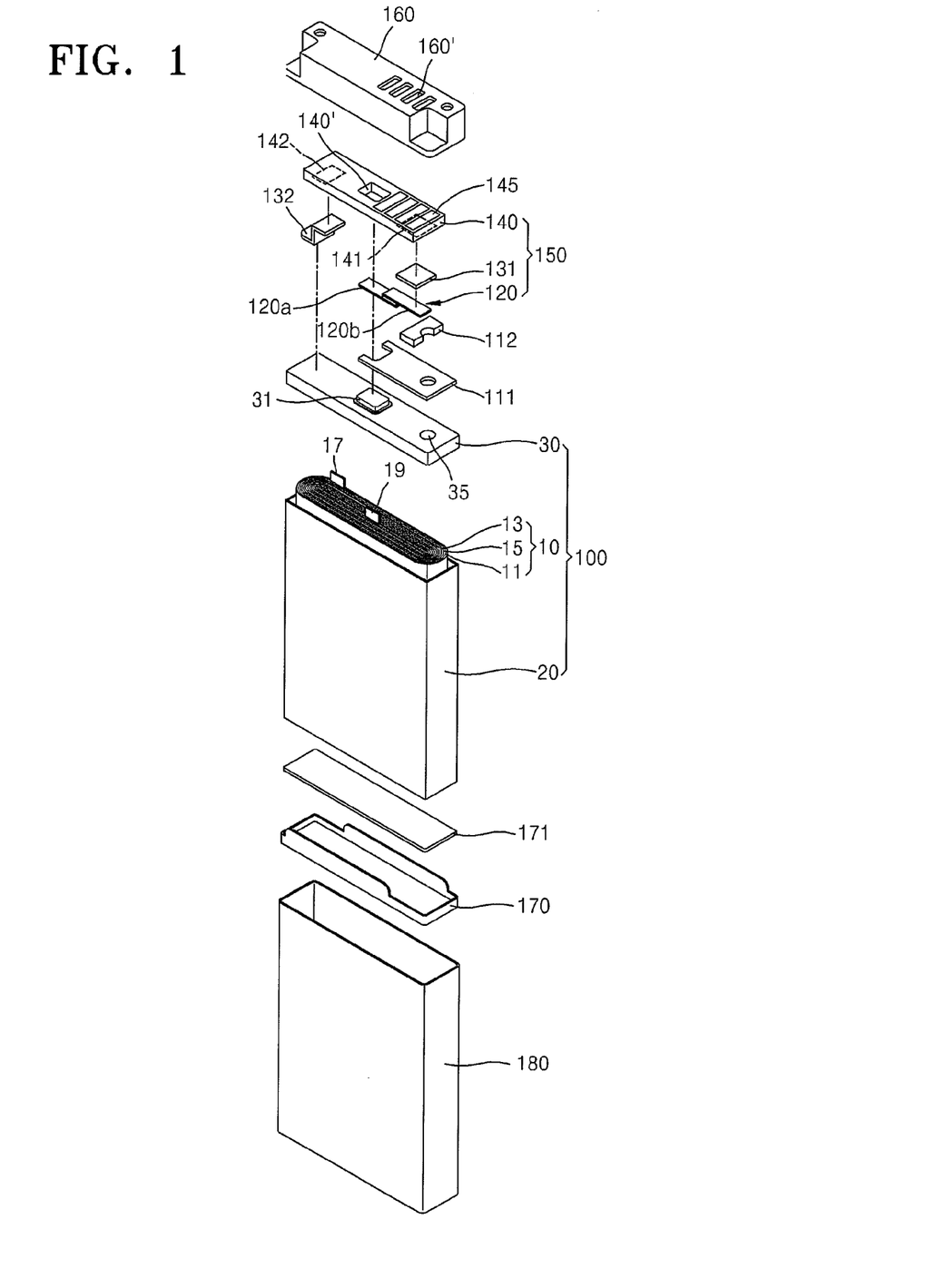
FIGS. 1 and 2 are exploded perspective views of a battery pack according to an embodiment of the present invention.
Figure 2:
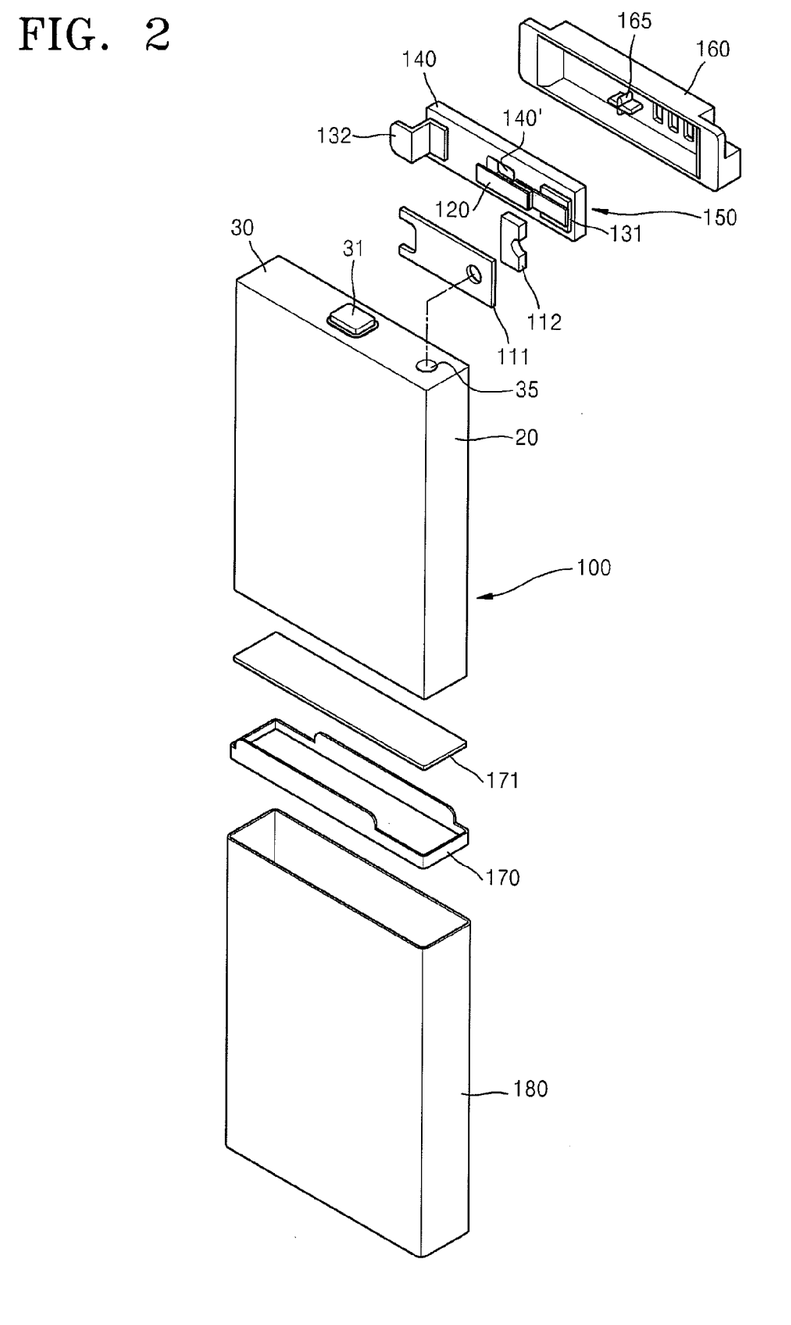
Figure 3:
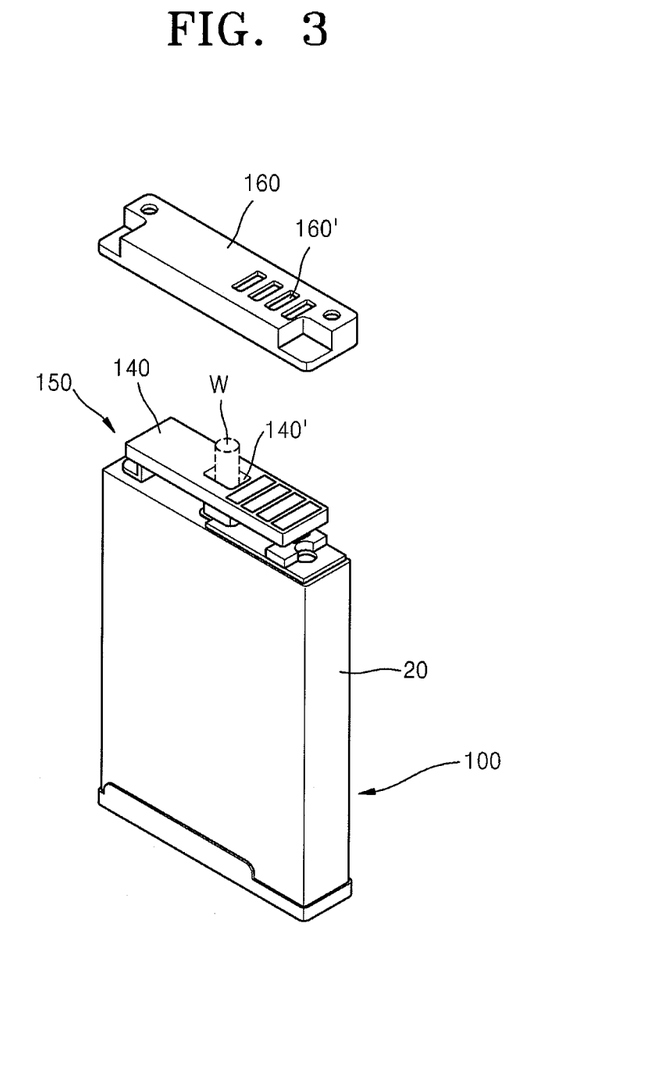
FIG. 3 is an exploded perspective view of a battery pack according to an embodiment illustrating penetration through a through-hole.

FIGS. 1 to 3 illustrate exploded perspective views of a battery pack according to an embodiment of the present invention. The battery pack includes a bare cell 100 including an element generating electric power, a protective circuit module (PCM) 150 mounted on the bare cell 100 and controlling a charging and discharging operation, and an upper cover 160 connected to the bare cell 100 to accommodate the PCM 150.

The bare cell 100 may be a rechargeable secondary battery, e.g., a lithium-ion battery, in which an electrode assembly 10 including a cathode plate 11, an anode plate 13, and a separator 15 is impregnated in an electrolyte (not shown) and sealed in a can 20. For example, the bare cell 100 can include an electrode assembly 10 including a stack of a cathode plate 11, an anode plate 13, and a separator 15 wound into a jelly-roll, a can 20 having an opening at the upper end to accommodate the electrode assembly 10 and the electrolyte, and a cap assembly 30 sealing the opening of the upper end of the can 20. The upper end of the can 20 may be closed by the cap assembly 30 after the electrode assembly 10 is accommodated therein. The cap assembly 30 and the can 20 may be airtight-coupled by welding the contact portion thereof using a laser beam.

For example, the cathode tap 17 of the electrode assembly 10 may be connected to the cap assembly 30 itself, and the anode tap 19 may be connected to a first terminal 31 extending from the upper surface of the cap assembly 30. The first terminal 31 may be bound to the cap assembly 30 while insulated from the cap assembly 30 and extend from the upper surface of the cap assembly 30 to electrically connect the bare cell 100 and the PCM 150.

A safety vent 35 may be designed to break to provide a path of a gas when an internal pressure of the can 20 is greater than a predetermined level. Such a safety vent may be disposed at one side of the cap assembly 30. Meanwhile, an insulating label sheet 180 coated with an adhesive may be attached to the outer surface of the bare cell 100. An adhesive agent 171 such as a double-coated tape may be attached to the bottom surface of the bare cell 100 to connect the bare cell 100 with a lower cover 170.

According to an embodiment, PCM 150 controls the charging and discharging operation of the bare cell 100 and performs a protective operation to protect the operation of the bare cell 100. The PCM 150 may include a protective circuit board 140, a positive temperature coefficient (PTC) protective device 120, and first and second connecting members 131 and 132.

According to embodiments, the protective circuit board 140 and the PTC protective device 120 prevent overcharge, over-current, over-discharge, etc. The PTC protective device 120 may form a charging and discharging current path between the protective circuit board 140 and the bare cell 100 which will be described later, and force the current to decrease if the charging and discharging current is greater than a predetermined level.

The protective circuit board 140 may include a wiring pattern to form a charging and discharging current path between an external device and the bare cell 100, and may be a printed circuit board (PCB) having a protective circuit limiting the charging and discharging current of the bare cell 100. For example, an external connection terminal 145 for electrical connection with the external device may be disposed at one surface of the protective circuit board 140, and first and second electrode pads 141 and 142 for electrical connection with the bare cell 100 may be disposed on the other surface of the protective circuit board 140. The external connection terminal 145 may directly contact the external device to input the charging and discharging current into the bare cell 100, or output the charging and discharging current from the bare cell 100.

The first electrode pad 141 may be connected to the first terminal 31 of the cap assembly 30, and the second electrode pad 142 may be connected to the upper surface of the cap assembly 30. The first and second connecting members 131 and 132 may be disposed at positions corresponding to the first and second electrode pad 141 and 142 to mediate electric connection, and the PTC protective device 120 may be interposed between the first connecting member 131 and the first terminal 31 of the cap assembly 30 to form the current path therebetween. The first electrode pad 141 may be connected to the first terminal 31 of the cap assembly 30 via the PTC protective device 120, and the PTC protective device 120 may include a lead 120a connected to the first terminal 31 of the cap assembly 30 at one end and a lead 120b connected to the first electrode pad 141 via the first connecting member 131 at the other end.

The lead 120a of the PTC protective device 120 may be welded to be fixed on the first terminal 31 of the cap assembly 30. For example, a through-hole 140' may be formed nearly at the center of the protective circuit board 140, and a welding apparatus W (as shown in FIG. 3), for example, a column-shaped electrode for welding, may be inserted through the through-hole 140' to perform a spot welding that is a resistance welding between the lead 120a of the PTC protective device 120 and the first terminal 31. The through-hole 140' may be used to directly weld the PTC protective device 120 and the first terminal 31 and provide a path of the welding apparatus W.

Meanwhile, the second electrode pad 142 of the protective circuit board 140 may be connected to the upper surface of the cap assembly 30 via the second connecting member 132. For example, the second connecting member 132 may have stepped upper and lower parts that is twice-bent, wherein the upper part is connected to the second electrode pad 142, and the lower part is connected to the cap assembly 30. The first and second connecting members 131 and 132 may be formed by processing a nickel (Ni) or aluminum (Al) thin film to have a predetermined shape.

An insulation tape 111 and an insulation spacer 112 may be interposed between the PCM 150 and the cap assembly 30. The insulation tape 111 and the insulation spacer 112 can prevent an electrical short-circuit between the PCM 150 and the cap assembly 30. For example, the insulation tape 111 may be interposed between the PTC protective device 120 and the cap assembly 30 to prevent a short-circuit. The insulation spacer 112 can support a part of the PCM 150 so that the PCM 150 is spaced apart from the cap assembly 30 by a predetermined distance. The insulation spacer 112 may support the step difference between the leads 120a and 120b disposed at both sides of the PTC protective device 120. The PTC protective device 120 may be disposed on the cap assembly 30 by interposing the insulation spacer 112 that supports the stepped structure therebetween. Meanwhile, the insulation tape 111 and insulation spacer 112 may have an opening corresponding to the safety vent 35 so that the safety vent 35 formed on the cap assembly 30 is not blocked.

Figure 4:
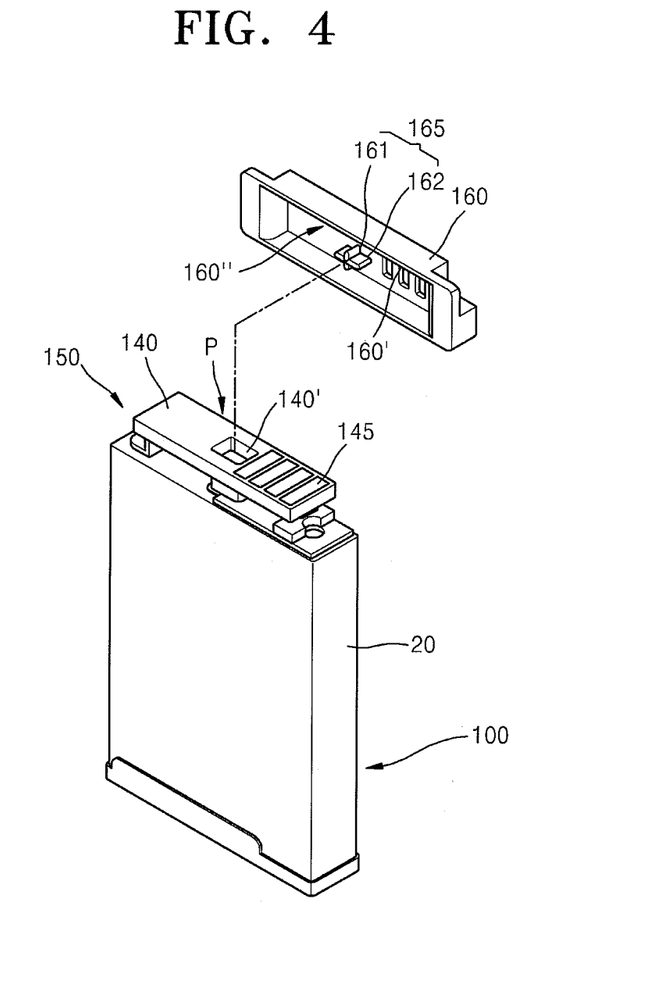
FIG. 4 is an exploded perspective view of an assembled upper cover of a battery pack according to an embodiment.

FIG. 4 is an exploded perspective view of an assembled upper cover 160 of the battery pack. Referring to FIG. 4, the upper cover 160 is assembled onto the bare cell 100 to accommodate the PCM 150 mounted on the bare cell 100. The upper cover 160 may have an opening pattern 160' to expose the external connection terminal 145 of the protective circuit board 140 and allow the external connection terminal 145 to be connected to an external device. A double-coated tape (not shown) may be interposed between the upper cover 160 and the PCM 150 to mediate to the connection thereof.

The upper cover 160 may have an accommodation portion 160" having a concave shape to accommodate the PCM 150. The upper cover 160 can include a protrusion 165 protruding downward to the PCM 150 to be engaged with an assembly position P of the PCM 150. The protrusion 165 may be engaged with the PCM 150 integrated with the bare cell 100 so that the upper cover 160 and the bare cell 100 may be positioned. The protrusion 165 can align the upper cover 160 with respect to the bare cell 100, regulate the assembly position of the upper cover 160, and provide the binding force between the upper cover 160 and the bare cell 100. According to the illustrated embodiment, a through-hole 140' is formed at the assembly position P of the PCM 150, and the protrusion 165 is engaged with the through-hole 140'. The through-hole 140' may function as a path through which a welding apparatus W (as shown in FIG. 3) passes and an assembly structure with which the protrusion 165 is engaged. Since the through-hole 140' may be used to be engaged with the protrusion 165, a separate structure to be engaged with the protrusion 165 is not necessary, thereby simplifying the assembly structure.

Figure 5:
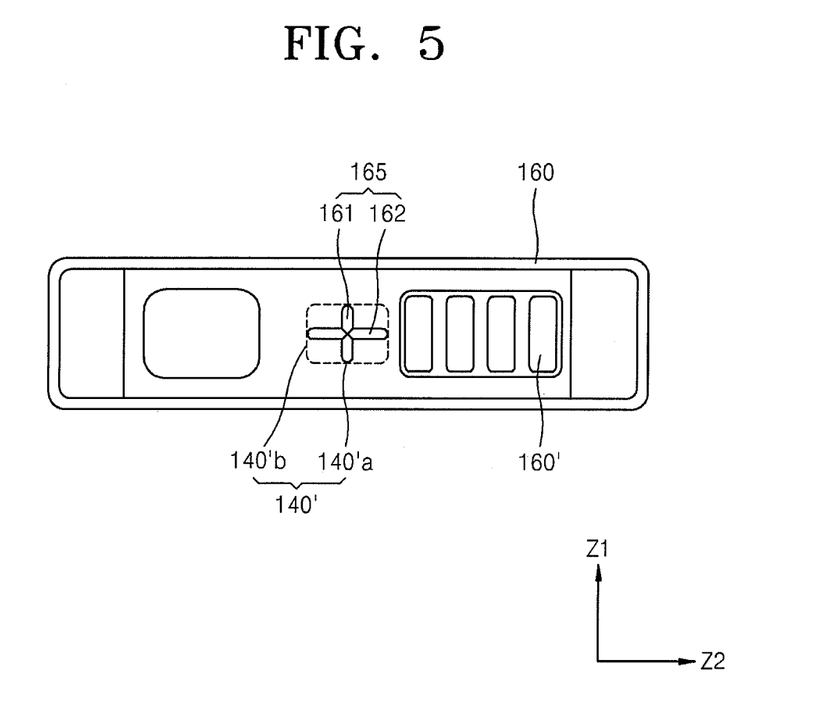
FIG. 5 shows an upper cover of the embodiment of FIG. 4.

FIG. 5 shows the protrusion 165 of the upper cover 160 of FIG. 4. Referring to FIG. 5, the protrusion 165 has a cross (+) rib structure including first and second ribs 161 and 162. The first and second ribs 161 and 162 may each independently extend in directions of first and second axis Z1 and Z2 to regulate the assembly position of the upper cover 160. That is, the first rib 161 may function as a hook for the through-hole 140' in the first axis direction Z1 to regulate the position of the upper cover 160, and the second rib 162 may function as a hook for the through-hole 140' in the second axis direction Z2 to regulate the position of the upper cover 160. The first and second ribs 161 and 162 may have sizes corresponding to that of the through-hole 140' so as to be engaged in the through-hole 140' of the protective circuit board 140. For example, if the through-hole 140' has a rectangular shape with a long side 140'a and a short side 140'b, the length of the first rib 161 corresponds to the length of the short side 140'b of the through-hole 140', and the length of the second rib 162 corresponds to the length of the long side 140'a of the through-hole 140'. The first and second ribs 161 and 162 can regulate the assembly position of the upper cover 160 by the hook for the through-hole 140', thereby preventing the misalignment with the bare cell 100.

Since the assembly position of the upper cover 160 can be easily regulated using the protrusion 165 in the structure described above, the assembling workability may be improved. Furthermore, time loss caused by displacement may be reduced by fixing the upper cover 160 at the right position, and defects caused by misalignment may also be reduced.

Figure 6:
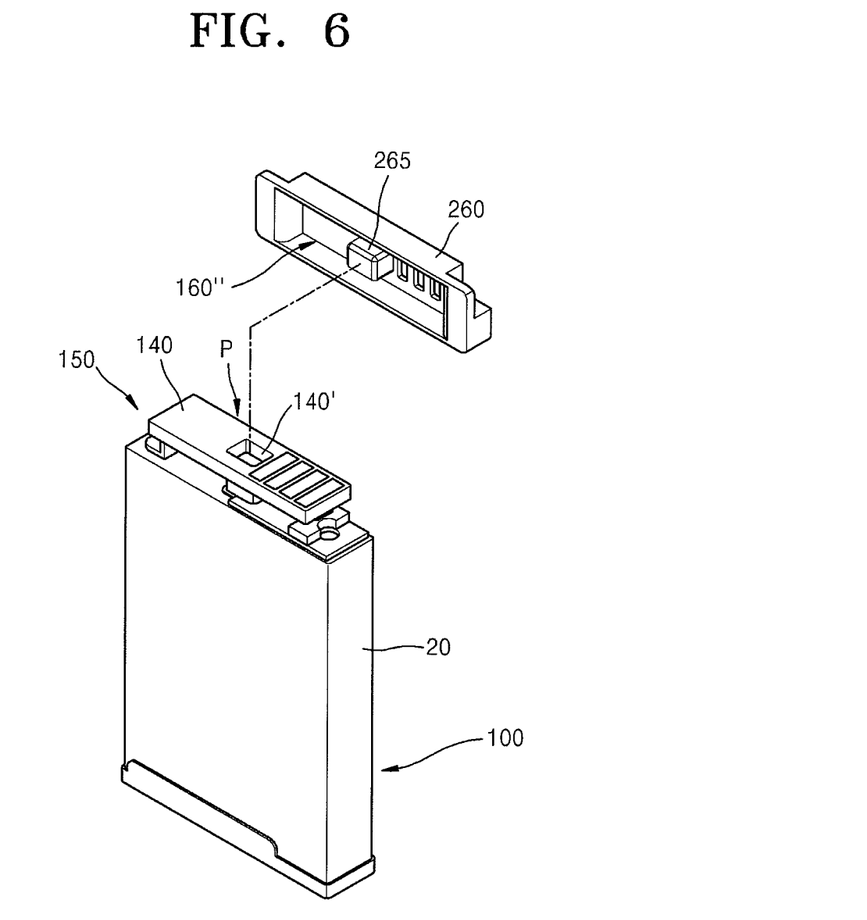
FIG. 6 is an exploded view of a battery pack according to another embodiment of the present invention.

FIG. 6 is an exploded view of a battery pack according to another embodiment of the present invention. Referring to FIG. 6, the battery pack can include a bare cell 100, a PCM 150 mounted on the bare cell 100, an upper cover 260 connected to the bare cell 100 to accommodate the PCM 150. The upper cover 260 can include a protrusion 265 protruding downward to the PCM 150 to be engaged with an assembly position P of the PCM 150. The assembly position P of the upper cover 260 may be determined by the engagement of the protrusion 265 with the PCM 150, and the upper cover 260 may be fixed at the right position since the protrusion 265 functions as a hook.

A through-hole 140' may be formed at the assembly position P of the PCM 150, and the protrusion 265 can be engaged with the through-hole 140'. The through-hole 140' can function as a path through which a welding apparatus W (FIG. 3) passes and an assembly structure with which the protrusion 265 is engaged. The protrusion 265 may have a shape matching with the through-hole 140', for example a rectangular shape.

Figure 7:
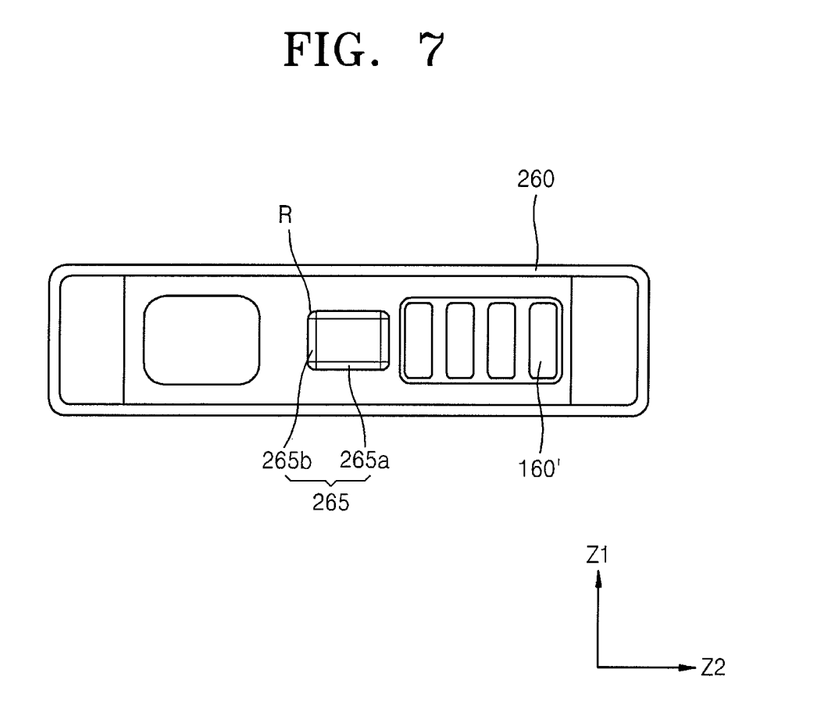
FIG. 7 shows an upper cover of the battery pack of the embodiment of FIG. 6.

FIG. 7 shows a protrusion 265 of the upper cover 260. The protrusion 265 may have a rectangular shape with a long side 265a and a short side 265b. For example, the long side 265a of the protrusion 265 can function as a hook for the through-hole 140' in the second axis direction Z2 to regulate the assembly position of the upper cover 260. The short side 265b of the protrusion 265 can function as a hook for the through-hole 140' in the first axis direction Z1 to regulate the assembly position of the upper cover 260. In order to maintain a close contact between the protrusion 265 and the through-hole 140', tolerance therebetween may be maintained within a predetermined range, thereby efficiently regulating the position of the upper cover 260. The protrusion 265 may have round portions R at corners thereof to reduce unnecessary interference between the protrusion 265 and the through-hole 140' during the assembly.

The upper cover 260 may have a binding force sufficient to be integrated with the bare cell 100 to form the battery pack. For example, the protrusion 265 may be forced to be engaged with the through-hole 140' to provide a sufficient binding force. If desired, the binding force of the upper cover 260 may increase using an additional structure. For example, a double-coated tape (not shown) may be interposed between the upper cover 260 and the PCM 150 to strongly assemble the upper cover 260 with the bare cell 100.

Figure 8:
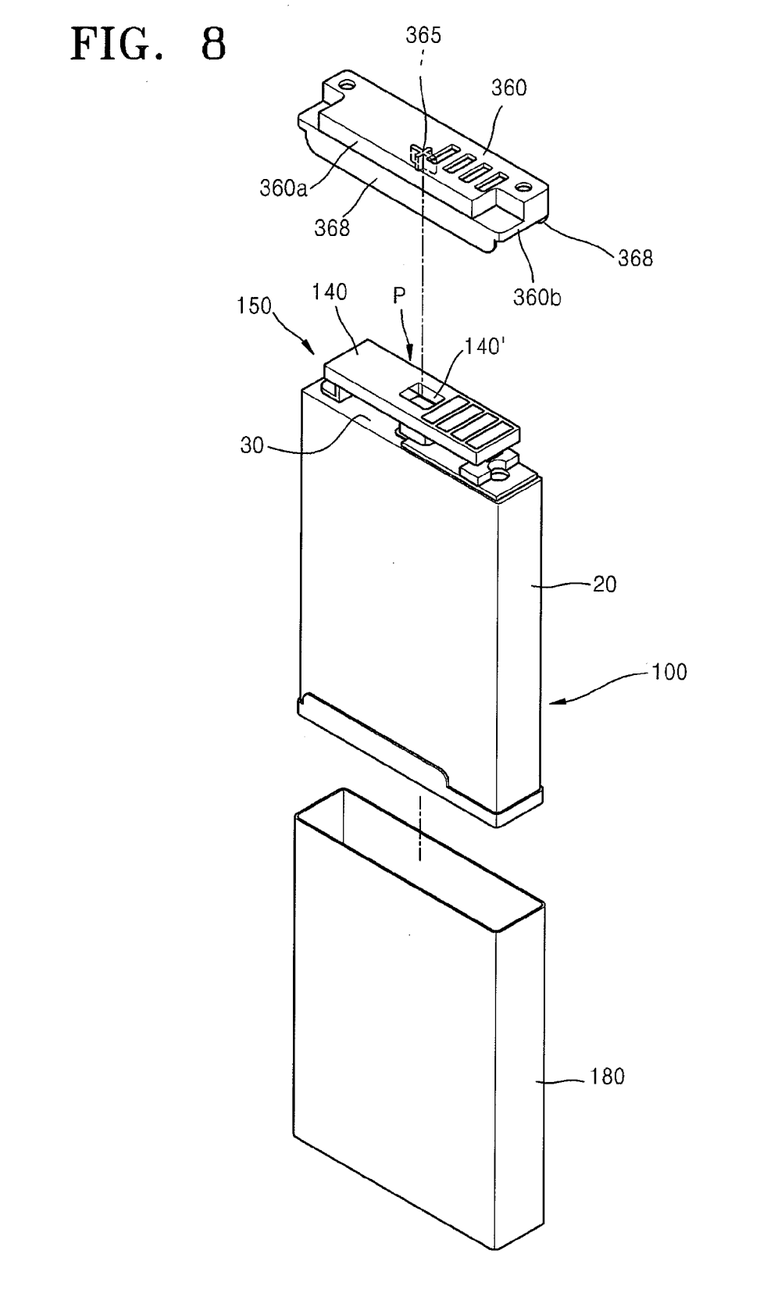
FIG. 8 is an exploded perspective view of a battery pack according to another embodiment of the present invention.

FIG. 8 is an exploded perspective view of a battery pack according to another embodiment of the present invention. Referring to FIG. 8, the battery pack can include a bare cell 100, a PCM 150 mounted on the bare cell 100, and an upper cover 360 connected to the bare cell 100 so as to accommodate the PCM 150. The PCM 150 may be fixed on the bare cell 100 using, e.g., spot welding, and the upper cover 360 may be assembled onto the PCM 150. In this regard, the upper cover 360 can include a protrusion 365 protruding downward to the PCM 150 to be engaged with an assembly position P of the PCM 150. For example, the assembly position P of the upper cover 360 may be determined by the engagement of the protrusion 365 with the PCM 150. Due to the tight coupling between the protrusion 365 and the through-hole 140', the assembly position of the upper cover 360 can be regulated, and displacement of the upper cover 360 may be avoided.

A sleeve 368 extending from the edge of a side of the upper cover 360 and covering a portion of a side of the bare cell 100 may be disposed along the edge of the upper cover 360. For example, the sleeve 368 may extend from the long side 360a of the upper cover 360 to cover a portion of a side of the bare cell 100. The sleeve 368 may be used to strongly fix the upper cover 360. For example, displacement of the upper cover 360 may be avoided by the sleeve 368 that is disposed to cover a portion of a side of the bare cell 100 and function as a hook. The sleeve 368 and the protrusion 365 may be disposed at different positions in the upper cover 360 to determine the assembly position of the upper cover 360 and prevent displacement of the upper cover 360 from the determined assembly position. Meanwhile, although not shown herein, the sleeve 368 may be formed along the short side 360b of the upper cover 360, or along the long side 360a/short side 360b.

Meanwhile, during the last stage of the assembly of the battery pack, the outer surface of the bare cell 100 may be surrounded by an insulating label sheet 180 coated with an adhesive. In this regard, the sleeve 368 may also be surrounded by the insulating label sheet 180, and thus the binding force between the upper cover 360 and the bare cell 100 may increase by the insulating label sheet 180.

Figure 9:
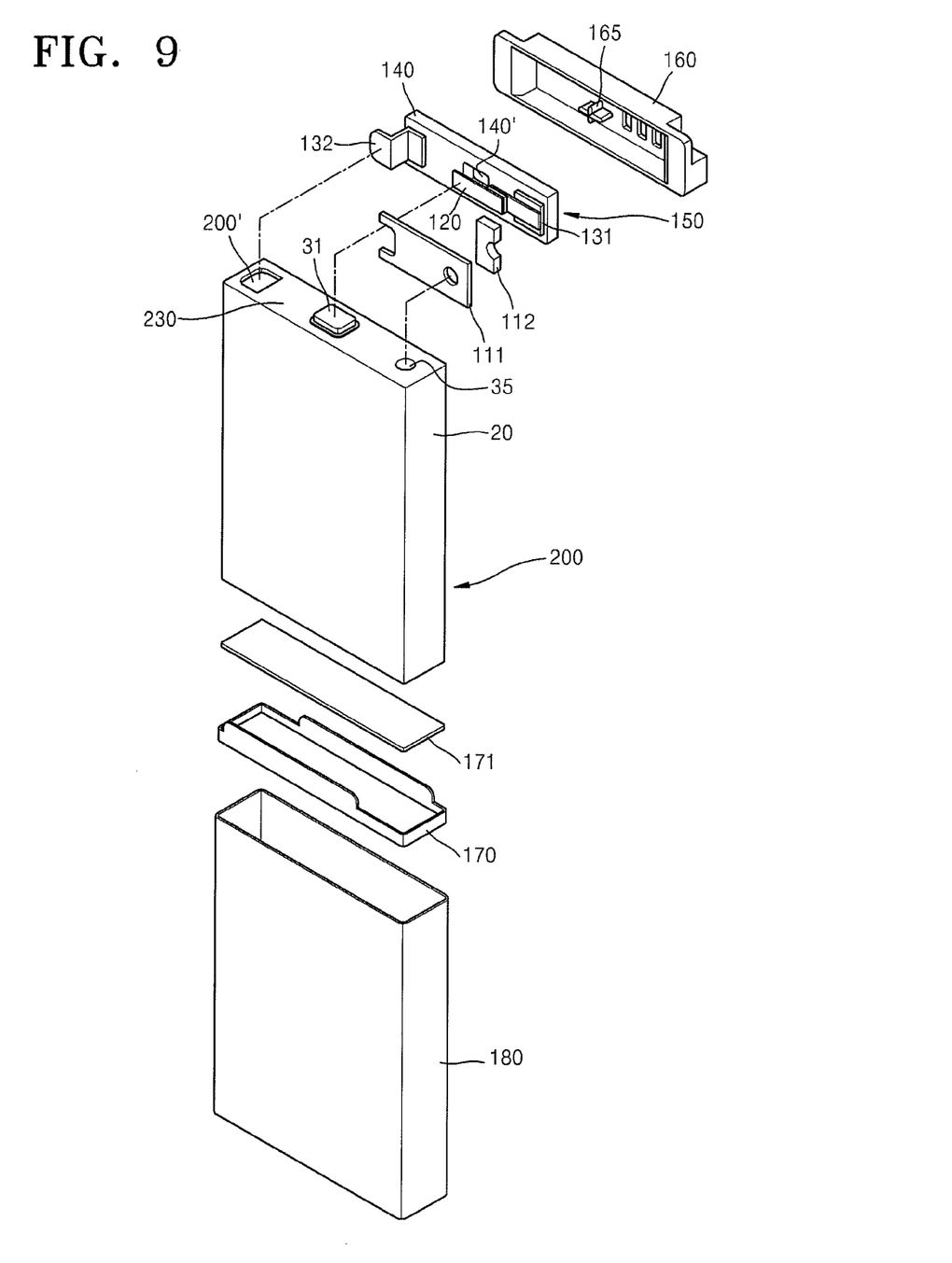
FIG. 9 is an exploded perspective view of a battery pack according to another embodiment of the present invention.

FIG. 9 is an exploded perspective view of a battery pack according to another embodiment of the present invention. Referring to FIG. 9, the battery pack can include a bare cell 200, a PCM 150 mounted on the bare cell 200, and an upper cover 160 connected to the bare cell 200 so as to accommodate the PCM 150. Here, the upper cover 160 and the PCM 150 may be aligned by engaging the protrusion 165 of the upper cover 160 into a through-hole 140' of the PCM 150.

Meanwhile, a position determining unit 200' or alignment member may be disposed at a contact portion between the PCM 150 and the bare cell 200 to align the PCM 150 and the bare cell 200. As shown in FIG. 9, the position determining unit 200' may have a concave shape retracted from the upper surface of the bare cell 200. The position determining unit 200' may be formed to match the second connecting member 132 at a contact position between the position determining unit 200' and the second connecting member 132 of the PCM 150. The displacement of the PCM 150 may be avoided since the second connecting member 132 can be inserted into the position determining unit 200', and the assembly may be easily conducted since the PCM 150 can be fixed before performing an assembling process such as a spot welding. Meanwhile, the position determining unit 200' may also be disposed at the PCM 150 instead of at the bare cell 200. Alternatively, the position determining unit 200' may also be a pair disposed at the both bare cell 200 and the PCM 150 and may match each other. Reference numeral 230 that is not described herein indicates a cap assembly. The position determining unit 200' may also be disposed in the cap assembly 230 forming the upper part of the bare cell 200.

While embodiments of the present invention has been particularly shown and described, it will be understood by those of ordinary skill in the art that various changes in form and details may be made therein without departing from the spirit and scope of the invention.

What is claimed is:
1. A battery pack comprising:
   a bare cell, wherein the bare cell comprises a terminal that is in a location on the bare cell;

a circuit module coupled with the bare cell, wherein the circuit module is separate from the bare cell and comprises a protective device and a through-hole, and wherein the through-hole is sized and positioned to be aligned with the location on the bare cell so as to enable welding of the protective device of the circuit module to the terminal of the bare cell through the through-hole; and a cover disposed over the circuit module and coupled with the bare cell, wherein the cover comprises a protrusion that is in a location on the cover that corresponds to the location on the bare cell, and wherein the protrusion engages with the through-hole;

such that the terminal of the bare cell, the through-hole of the circuit module, and the protrusion of the cover are aligned with each other.

2. The battery pack of claim 1, wherein the protrusion comprises at least one rib that engages with at least one side of the through-hole.

3. The battery pack of claim 1, wherein the protrusion comprises two ribs in a cross structure.

4. The battery pack of claim 1, wherein the protrusion and the through-hole have the same shape and substantially the same dimensions.

5. The battery pack of claim 4, wherein the protrusion comprises a rounded corner.

6. The battery pack of claim 1, further comprising a sleeve extending from an edge of the cover, wherein the sleeve contacts a surface of the bare cell.

7. The battery pack of claim 6, wherein the bare cell further comprises a label sheet coated with an adhesive surrounding the bare cell, and the sleeve contacts the adhesive.

8. The battery pack of claim 1, wherein the bare cell further comprises an alignment member disposed on an upper surface of the bare cell.

9. The battery pack of claim 8, wherein the circuit module further comprises a connecting member disposed on a lower surface of the circuit module that corresponds with the alignment member of the bare cell.

10. The battery pack of claim 9, wherein the alignment member of the bare cell is a concave portion and the connecting member of the circuit module is an extended structure inserted into the concave portion.

11. The battery pack of claim 1, wherein the protrusion enables alignment of the cover to the bare cell.

12. The battery pack of claim 1, further comprising an insulation tape between the bare cell and the circuit module, wherein the insulation tape comprises a through-hole that corresponds with a safety vent in the bare cell.

13. The battery pack of claim 1, further comprising an insulation spacer between the bare cell and the protective device, wherein the bare cell and the protective device has a height difference that is supported by the insulation spacer.

14. A battery pack comprising:
a bare cell, wherein the bare cell comprises a terminal in a location;
a circuit module coupled with the bare cell, wherein the circuit module is separate from the bare cell;
a cover disposed over the circuit module and coupled with the bare cell; and
a protrusion protruding from the cover formed in a location of the cover that corresponds to the location of the terminal, wherein the protrusion comprises two ribs in a cross structure;
wherein the circuit module comprises a through-hole and the protrusion engages with the through-hole, and the through-hole is positioned and dimensioned so that the terminal of the bare cell is positioned so as to be aligned with both the through-hole of the circuit module and the protrusion of the cover.

15. A battery pack comprising:
a bare cell, wherein the bare cell comprises a terminal wherein the terminal is formed in a location on the bare cell;
a circuit module coupled with the bare cell, wherein the circuit module is separate from the bare cell;
a cover disposed over the circuit module and coupled with the bare cell; and
a protrusion extending from the cover at a first location of the cover that corresponds to the first location of the bare cell;
wherein the circuit module comprises a through-hole that is sized and positioned so that the terminal is positioned so as to be aligned with the through-hole so as to enable welding of the protective device of the circuit module to the terminal of the bare cell through the through-hole, and the protrusion engages with the through-hole, such that the protrusion of the cover, the through-hole of the circuit module, and the terminal of the bare cell are aligned with each other; and
wherein the protrusion and the through-hole have the same shape and substantially the same dimensions.

16. The battery pack of claim 15, wherein the protrusion and through-hole have a rectangular shape.

* * * * *